Aug. 11, 1942.         J. A. KENNEDY         2,292,700
ELECTRICALLY HEATED FILLING AND SMOOTHING TOOL
Filed Nov. 29, 1940

INVENTOR,
James A. Kennedy
BY
ATTORNEY.

Patented Aug. 11, 1942

2,292,700

UNITED STATES PATENT OFFICE 2,292,700

ELECTRICALLY HEATED FILLING AND SMOOTHING TOOL

James A. Kennedy, Los Angeles, Calif.

Application November 29, 1940, Serial No. 367,731

1 Claim. (Cl. 219—21)

This invention relates to an electrically heated filling and smoothing tool designed particularly for use in filling in and building up and smoothing body and fender dents and hollow places such as occur in automobile bodies, fenders and the like.

In filling in and smoothing such dents and hollow places, it has been found that if the plastic material used is melted on the heated flat surface of the tool and is filled into the dent or hollow, it can be moulded into such dent or hollow place by using the rounded hot portion of the head of the tool until the metal in which the dent or hollow place occurs, is sufficiently heated to cause a good bond between said metal surface and the fill material, after which the hollow place can be filled in and built up flush with the surrounding surface and made smooth by continuing to use the heated tool. It is then ready for filing and sanding. It will be understood, that the dent or hollow place is first cleaned by removing all wax and foreign substances and after breaking the gloss.

In order to accomplish this I have devised a special tool for the purpose, said tool having a round smooth top portion, at the end, and also having a flat smoothing surface or portion, with a heating element therein.

I have illustrated on the accompanying sheet of drawings one practical embodiment of my invention, which I will now describe:

Figure 1:
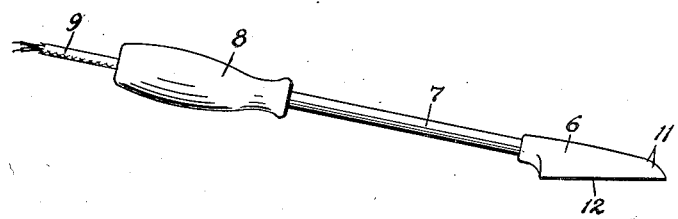
Figure 1 is a side elevation of a tool embodying my invention.
Figure 2:
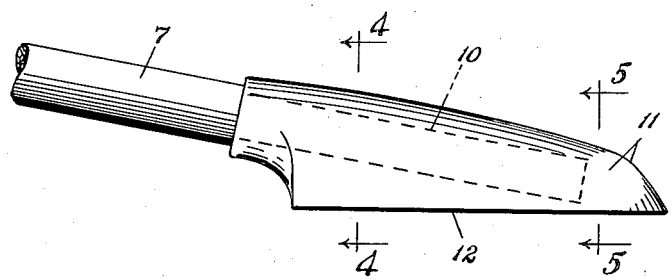
Figure 2 is an enlarged view of the tool head, with the heating element indicated in light broken lines, and the handle omitted.
Figure 3:
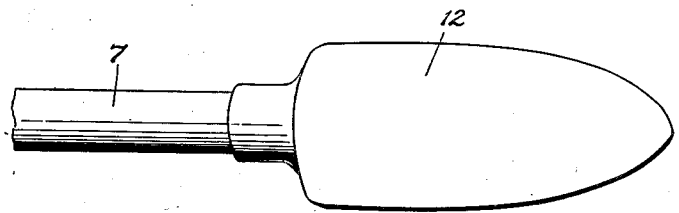
Figure 3 is a similar view showing the smooth flat bottom of the tool.
Figure 4:
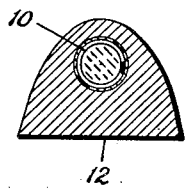
Figure 5:
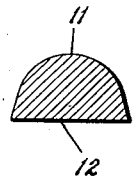

Figures 4 and 5 are sectional views, taken on lines 4—4 and 5—5, respectively, on Fig. 2.

Referring now in detail to the drawing, the invention as here illustrated consists of a head 6, with stem or shank 7, handle 8, and with electric wires 9 extended through the handle and stem to the heating element 10, inserted in a bore in the head, as indicated in the light broken lines in Fig. 2. This general construction and arrangement is not in and of itself new.

The head is so formed as to provide the round top surface 11, at the end or point of the head 6, which is perfectly smooth and round and free from any angles or ridges, and so designed that it can be used in rubbing around and around in the hollow place or dent for the purpose of heating the metal body and molding the fill material thereinto until a perfect bond is established. The tool is, of course, sufficiently heated so that it will heat the fill material and also heat the portion of the body in which the hollow place was made, sufficiently to cause said fill material to be permanently adhered thereto, whereupon it can be built up and smoothed over so as to be even with the surrounding surface.

Applicant uses what he calls a "plasto-fil" material, a thermoplastic material, which can be melted on to the flat bottom of the head of the tool and then scraped off on to the end of the stick or bar of said material to be picked up a little at a time and rubbed and moulded into the dent with the round head of the tool, and at the same time sufficiently heated as it is moulded and built up to establish a permanent bond between said material and the metal body.

The round moulding portion of the tool is designated 11 and the flat, smooth bottom is designated 12.

As the inner surface of the dent or hollow place is thoroughly coated with the molten material and is worked until the surface is well heated, a perfect bond is developed and the fill may be thus gradually built up with the application and moulding of the molten material. This plastic material when cool becomes very hard and can be filed and sanded and made perfectly smooth when finished.

I do not limit my invention to the exact details shown and described, for I know that changes can be made without departing from the spirit of the invention, except as I may be limited by the hereto appended claim.

I claim:

A tool of the character and design shown and described and comprising an elongated body having a flat, smooth side corresponding to the work surface of a flat iron and tapering to a point, said body in cross section, near its end, being of arched form, tapering toward the point of said flat work surface, said end being round from side to side and from its end rearwardly, whereby to form a ball-like rounded top end, merging in an angle with the bottom surface at said end, said body having therein an electric heating element lengthwise thereof, and provided with a handle extending lengthwise from its rear end upwardly in an inclined position, and electric wiring through said handle to the heating element, for the purposes described.

JAMES A. KENNEDY.